United States Patent [19]

Giacomotti et al.

[11] 4,237,376

[45] Dec. 2, 1980

[54] EVENT MONITOR FOR COURT GAMES

[76] Inventors: Richard A. Giacomotti; Sally A. Giacomotti, both of 542 Calle Mastil, Santa Barbara, Calif. 93111; Julian L. Petrini; Madeline A. Petrini, both of 3748 Meru La., Santa Barbara, Calif. 93105; Ted L. Slater, 1822 Bath St., Santa Barbara, Calif. 93101

[21] Appl. No.: 11,526

[22] Filed: Feb. 12, 1979

Related U.S. Application Data

[63] Continuation-in-part of Ser. No. 779,610, Mar. 21, 1977, Pat. No. 4,139,764.

[51] Int. Cl.³ .................. G06K 19/06; G06K 19/08
[52] U.S. Cl. .................................. 235/487; 235/493; 360/2
[58] Field of Search .................. 235/487, 493, 494; 360/2

[56] References Cited

U.S. PATENT DOCUMENTS

| | | | |
|---|---|---|---|
| 3,211,470 | 10/1965 | Wilson | 235/494 |
| 3,700,862 | 10/1972 | Snook et al. | 235/494 |
| 3,916,160 | 10/1975 | Russo et al. | 235/494 |

Primary Examiner—Daryl W. Cook
Attorney, Agent, or Firm—Spensley, Horn, Jubas & Lubitz

[57] ABSTRACT

A method and system for monitoring court games is described in which a counter is actuated by a card bearing a predetermined code. Upon being actuated, the counter is preset to a predetermined period of play for a game in a court with which the monitor is associated. When the predetermined period of play has expired the event monitor signals this condition permitting the other players to actuate the system and commence their use of the court. The card used to actuate the counter preferably bears both an optical and a magnetic code, thereby significantly complicating counterfeiting while also providing additional information bearing areas for controlling various systems associated with the court, and preferably can be used in any of multiple directions to actuate the counter.

10 Claims, 13 Drawing Figures

EVENT MONITOR FOR COURT GAMES

CROSS REFERENCE TO RELATED APPLICATIONS

This application is a continuation-in-part of our copending application, Ser. No. 779,610, filed March 21, 1977, now U.S. Pat. No. 4,139,764, and entitled "Event Monitor for Court Games."

BACKGROUND OF THE INVENTION

The invention relates to an event monitor for court games, especially one which incorporates a self-regulating feature to permit unattended use of a court, or set of courts.

With the increasing popularity of court games, such as tennis, regulating usage of the courts presents an increasing problem. Typically a predetermined period is provided for the use of the court by each player, or group of players. However, since no truly satisfactory way exists to monitor the expired period of usage by players already on the court, subsequent players must depend upon their integrity in determining the extent of time still left to players already on the court. Also, since such courts are expensive to construct and maintain, it is desirable to recoup at least some of this cost by charging the players using the court for such usage. While it is possible both to monitor the period of usage and charge for such usage by providing an attendant for the court, or group of courts, this approach only adds to the cost and seldom is used.

It is quite desirable, for these reasons, to achieve a system that will automatically monitor the period of usage of the court by one group of players and signal to other, waiting players the amount of time left to the players on the court. Also, it is desirable to incorporate in such a system provisions requiring players using the court to pay for such usage. Further, it is desirable to provide for unattended actuation and use of the system, preferably by a light, simple card or token but one difficult to counterfeit. These and other objects of the invention will be apparent from the following description of a preferred embodiment.

BRIEF DESCRIPTION OF THE INVENTION

A method and two preferred systems for monitoring court games are described in which a counter is actuated by a card bearing a predetermined code. The card used to actuate the counter preferably bears both an optical and a magnetic code, thereby significantly complicating counterfeiting while also providing additional information bearing areas for controlling various systems associated with the court, and preferably can be used in any of multiple directions to actuate the counter. In the preferred method and system, the event monitor first reads the code or codes on the card used to actuate it, compares the read code with a predetermined code, then actuates the system in accordance with the code only when the read and predetermined codes coincide. Also, the event monitor may mutilate the card upon its being used in the system, regardless of whether or not it was successful in actuating the system, this mutilation destroying false cards and preventing repeated use of correct cards.

Upon being actuated, the counter is preset to a predetermined period of play for a game in a court with which the monitor is associated. The counter then counts the elapsed period of play and displays to other players waiting to use the court the period of play still remaining, confirming to them in a positive fashion the period they must wait to use the court. When the predetermined period of play has expired, the event monitor signals this condition permitting the other players to actuate the system and commence their use of the court.

The actuating circuit for the event monitor preferably includes sensor means for generating a multiplicity of simultaneous series of electric pulses as the card is employed to actuate the system. Code counter means are advanced in their count upon each occurrence of a predetermined coincidence between the corresponding pulses of the series. The actuating means also includes, preferably, a plurality of bi-stable circuits which are loaded with the count of the code counter upon a predetermined coincidence of corresponding pulses of the series. Means are also provided to read the condition of the loaded bi-stable circuits and to actuate the counter of the event monitor only when the bi-stable circuits are loaded with a predetermined condition. The actuating means further may include means to produce a strobe pulse upon the occurrence of a predetermined coincidence of the corresponding pulses of the generated series, means to detect the count of the code counter upon the occurrence of a strobe pulse and to disable the reading means if the count of the code counter then exceeds a predetermined count, thereby to provide added assurance that the event monitor will be actuated only by a card bearing a proper, predetermined code.

In another version of the system, sensor means for two separate data sources, such a optical and magnetic data, are provided. One data source is employed to verify the input data, the other data source providing certain variable input data used for example, to actuate the timer to any desired period. This other data source also may include other information such as verification code, and a code to selectively actuate court lights or other auxiliary equipment.

Both versions of the system employ a card having a unique structure. The card is imprinted, or otherwise formed, with two data tracks along parallel face edges, preferably the longitudinal edges, one of these data tracks providing timing information for the system, the other providing variable data information to the system. Preferably these tracks are oriented on the card such that data on the card can be read in at least two different orientations of the card, thereby permitting, in the perferred embodiment, either short edge of the card to be presented to the system first. In one version of the system, the card also includes another, or third, data track, this data source serving to provide input information to actuate the timer to any desired period, and also, if desired, to provide other information such as a verification code and codes to actuate other, auxiliary equipment. Preferably this third data track is so arranged that it, too, will actuate the system regardless of the orientation of the card upon its presentation to the system by the user.

BRIEF DESCRIPTION OF THE DRAWINGS

The invention will be further described in connection with the accompanying drawings in which:

FIG. 8 is a front view of another card which may be employed to actuate the event monitor;

DETAILED DESCRIPTION OF THE INVENTION

While preferred embodiments of the invention will be described, there are certain general principles employed in the event monitor which easily can be missed if only the construction of the preferred system is considered. Further, while the invention is useful to control almost any game area, it is particulary useful in monitoring usage of court games. For this reason, the subsequent detailed description of the invention relates to its use in connection with court games.

A basic principle of the event monitoring herein described is that it is self-monitoring, or self-regulating. Not only are players waiting for the court presented with the time left to play for players already on the court, but they are also told by the event monitor that the players on the courts still have time left to play. In other words, if players have entered the court without actuating the event monitor, subsequent players can actuate the event monitor and assume control of the court at that moment. If players have properly actuated the event monitor, subsequent players are told by the event monitor the time left for the players already on the court. The subsequent players then serve to monitor the usage of the players on the court and to terminate that usage upon expiration of the period.

The event monitor employs a card which must be used to actuate the monitor. This card incorporates certain code features that cooperate with the event monitor to provide a significant impediment to counterfeiting the card, thereby preventing improper actuation of the monitor. It is contemplated that, while these cards may be distributed free of charge, in the normal system they will be purchased by the players and automatically mutilated upon being used to actuate the event monitor, this mutilation preventing their subsequent use to again actuate an event monitor. In short, the event monitor system is designed to provide a self-regulating feature, subsequent players ejecting players already on the court when their period of use has expired, the system also permitting revenue to be realized by sale of the cards required to actuate the monitor, this revenue at least in part deferring the cost of maintaining the court. All of these features combine to provide a truly practical approach to fair and profitable court operation. It is expected to provide significant incentive to the construction of sufficient courts to meet the increasing demand.

Figure 1:
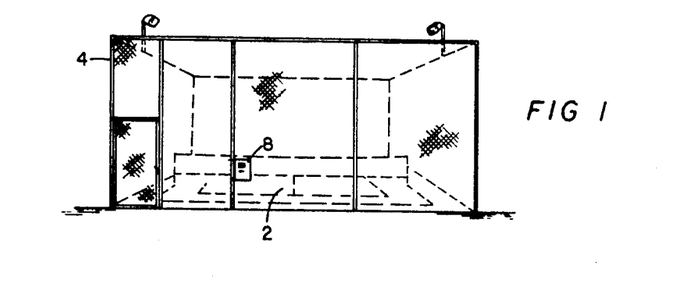
FIG. 1 is a perspective view of a court bearing an event monitor.
Figure 2:
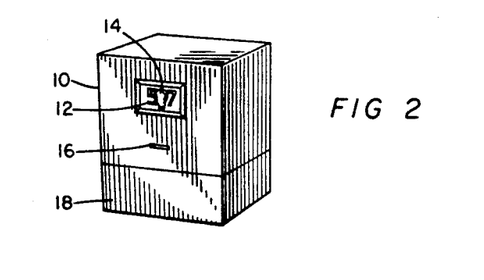
FIG. 2 is a perspective view of an event monitor.

Turning now to our preferred construction of the event monitor, illustrated in FIG. 1 is a court 2 surrounded by fencing 4 bearing lights 6 and an event monitor 8. The event monitor preferably is physically attached to one of the upright supports of the fencing on the outside of the fencing and is electrically powered by a cable passing to it through this support to impede vandalism. This location requires players to actuate the monitor prior to entering the court. As shown in FIG. 2, the event monitor includes a display 12 that presents the period of time left for usage of the court by players already on it. The event monitor may include a light 14 for signaling expiration of the period of play and the fact that the court is open for usage by other players, whether or not players still are on the court. The housing also includes a slot 16 in which a card designed to actuate the monitor may be deposited, the card passing through the housing to a lower receptable portion 18, which portion periodically may be opened and emptied of cards.

Figure 3:
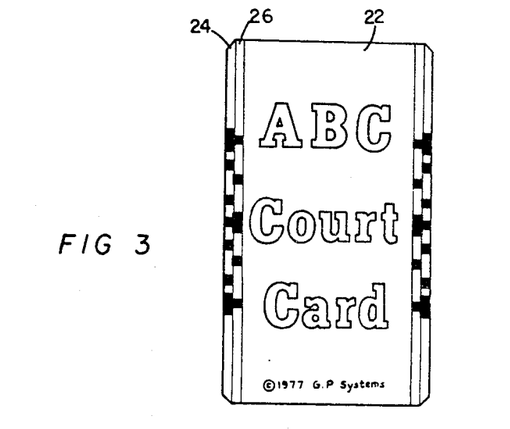
FIG. 3 is a front view of a card employed to actuate the event monitor.

A typical card designed to actuate the system is illustrated in FIG. 3. It bears in two tracks 24 and 26 along both longitudinal edges of the card certain indicia designed to actuate the event monitor. In one embodiment, the card may be either translucent or opaque, and the tracks bear indicia that are either opaque or transparent, respectively, these indicia being read by a sensor incorporated with the event monitor to actuate a counter that resets the event monitor to a predetermined period of time, such as 60 minutes. Preferably the indicia borne by the two tracks along each longitudinal edge of the card are symmetrical about a center point of the card, permitting the card to be inserted into the event monitor in any orientation and still actuate the system if the code it bears corresponds to a predetermined code.

Figures 4, 5:
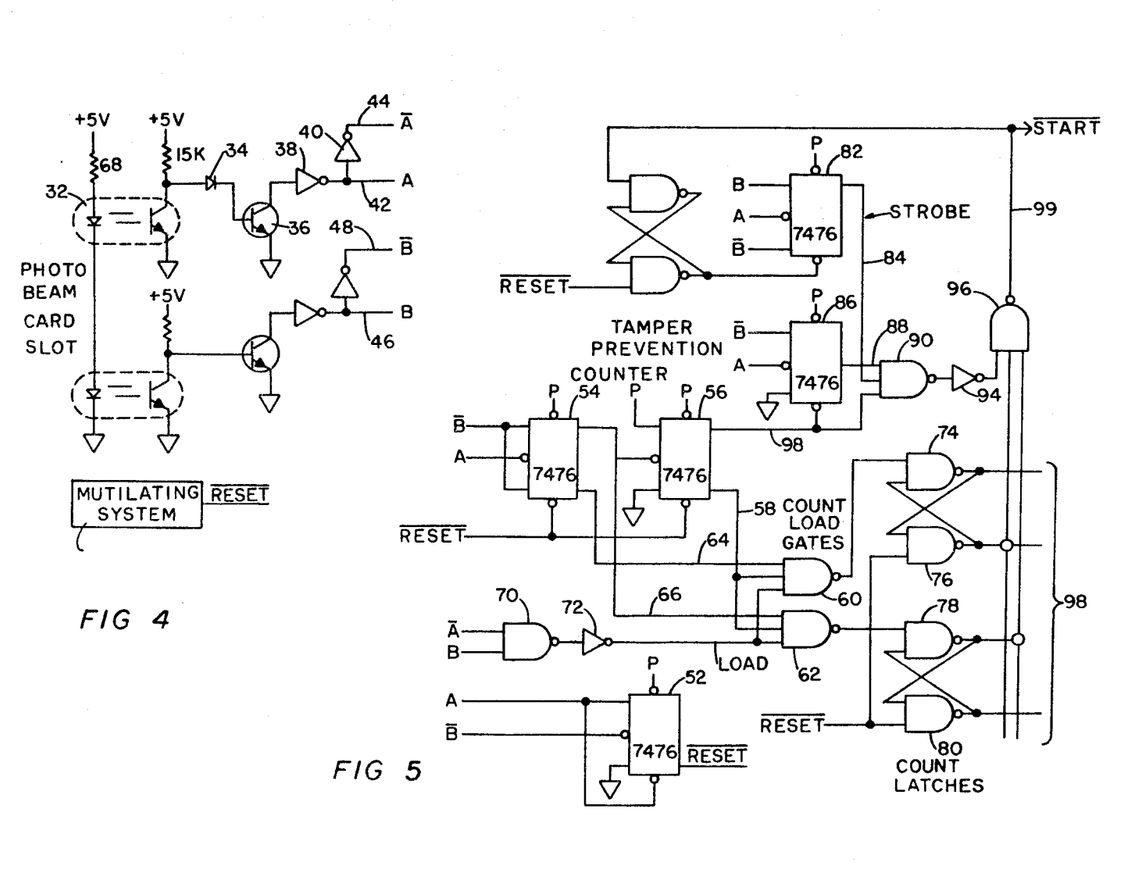
FIG. 4 is an electrical schematic of the circuit for reading the card employed to actuate the event monitor.
FIG. 5 is an electrical schematic of the circuit comparing the code borne by the read card with a predetermined code.
Figure 4:
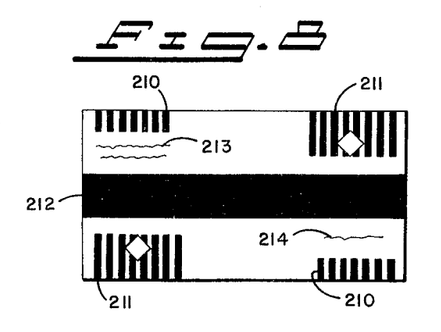
Figures 6, 7:
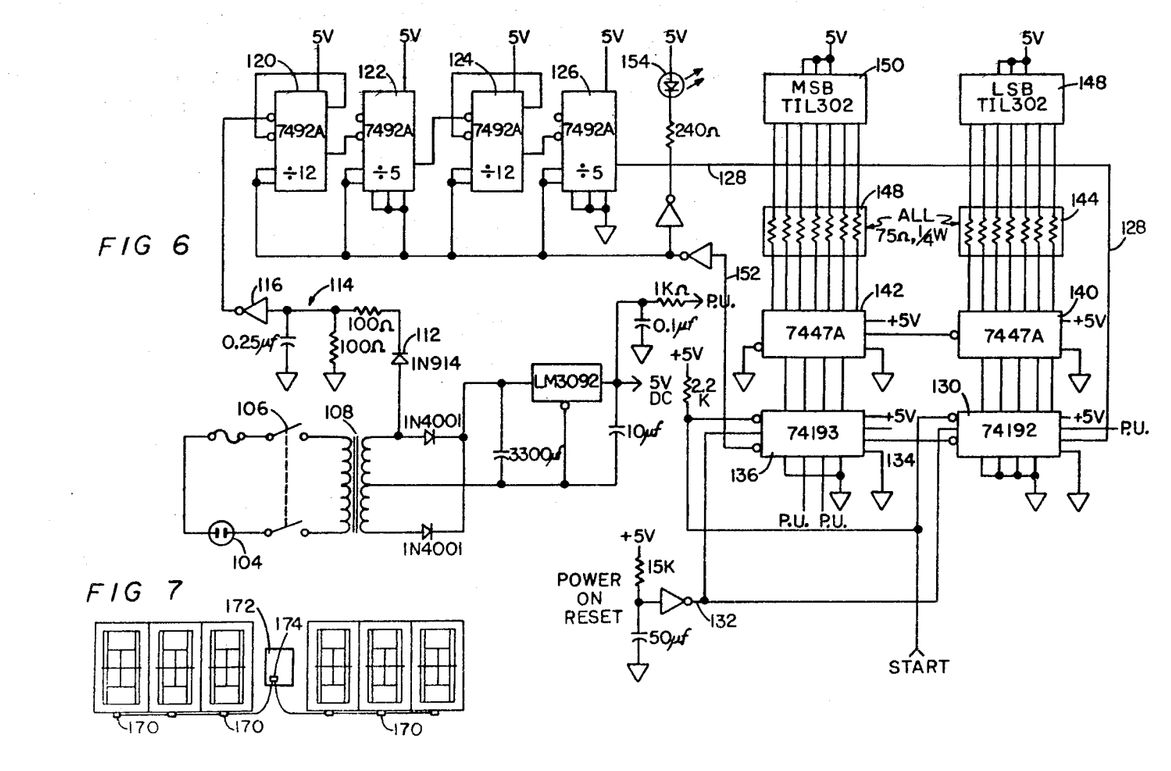
FIG. 6 is an electrical schematic of the counter circuit for signaling the unexpired period of play.
FIG. 7 is a plan view of a series of courts including an event monitor system.

A circuit for reading the card and producing two simultaneous series of electric pulses corresponding to the indicia on the card is illustrated in FIG. 4. This circuit includes two photoelectric sensors 32, each sensor incorporating a light-emitting diode, the light of which is directed to a photosensitive semiconductive element. These sensors are powered from a source of electric power, the circuit for which is illustrated in FIG. 6 and will be subsequently described. The sensors are oriented in the channel through the event monitor underlying slot 16 so that, as the card passes through the slot, one sensor will illuminate track 24 and the other sensor track 26. As the transparent and opaque portions of these two tracks pass by the sensors, the sensors each will produce a series of electric pulses, the pulses for each sensor being received by diode 34, amplified by transistor 36, and inverted by elements 38 and 40. At outputs 42 and 44 will be present two trains of electric pulses, one train being the inverse of the other. The output 42 train of pulses is designated pulse train "A," and the output 44 train of pulses is designated "$\overline{A}$." In a similar fashion, the second photosensor produces two trains of pulses on outputs 46 and 48, one being the inverse of the other, output 46 being designated train "B" and output 48 train "$\overline{B}$." These output trains of pulses are applied at various points in the circuit illustrated in FIG. 5 as indicated by the various designations.

Early in the transit of the card through the photodetector circuit illustrated in FIG. 4, the code patterns are designed such that output A will be in its more positive state, and output $\overline{B}$ will drop to its low, or less positive state. Upon this event occurring, the reset circuit 52 shown in FIG. 5 drops to a low condition. This output is applied at various indicated points in FIGS. 5 and 6, resetting these various bi-stable circuits to a predetermined condition. As subsequent opaque and transparent areas are sensed by the circuit illustrated in FIG. 4, the output pulse trains provided by this circuit will change in a corresponding fashion. Outputs A and $\overline{B}$ are applied to countercircuit elements 54 and 56 shown in FIG. 5, causing this counter to advance from its reset, 0 condition, one unit each time A drops from a high to a low state, while $\overline{B}$ remains high. The output of this counter on lead 58 is applied to count load gates 60 and 62. Also applied to these load gates are outputs 64 and 66 of counter stage 54. Upon occurrence of $\overline{A}$ and B, applied to a load gate 70, it produces an output which is inverted by element 72 and applied to count load gates 60 and 61. This load command causes the count conditions on lines 58, 64, and 66 to be applied to count latch bi-stable elements 74, 76, 78 and 80, which elements are set to a condition determined by the counts in counter elements 54 and 56.

A circuit also is provided in FIG. 5 that is designed to prevent erroneous actuation of the event monitor such a might be obtained by a random jiggling of a card partially placed in slot 16. This circuit includes element 82 which upon occurrence of the indicated signals will produce a strobe pulse on output line 84. The circuit also includes an element 86 which upon occurrence of the indicated signals will produce an output on line 88. The outputs on lines 84 and 88 are applied to element 90 together with an output of the counter element 56 applied on line 92. If the output of the counter exceeds a predetermined count, this condition will be indicated by the output on line 92 which is applied through element 90 upon occurrence of the strobe pulse to inverter 94 and through it to start command element 96. Also applied to the start command element are the output of the count latch elements as determined by matrix 98. As shown, this matrix is wired for a binary "two" output of the counter captured in the count latch elements upon occurrence of the load signal produced by element 70. If this count has been captured in the count latch elements and if the counter has not advanced beyond a binary count of four upon occurrence of the strobe signal on line 84, all of the signals applied to start command element 96 will be positive producing a start command signal on line 99. In this manner the system determines the presence of a valid card and then produces a "start" command.

The start command signal is applied to the counter illustrated in FIG. 6 on line 99. As illustrated, this circuit includes a power supply 102 producing a positive 5-volt DC output and another, modified power output "P." To the power supply is applied a 60-cycle 117-volt AC source of power 104 through a control switch 106 and a transformer 108. As previously noted, this source of power may be tapped from the power line for lights 6 on the court and led along the court fence posts to the event monitor, preferably being protected as by being encased in the supports to prevent disruption of power by vandalism. A 60-cycle signal is tapped from this source of power, rectified by element 112 and applied through a filter circuit 114 and a Schmitt trigger inverter element 116 to an input of counter 120. Counter 120 divides this 60-cycle signal by 12 and applies the output to counter 122 which divides it by five. The output of counter 122 is applied to counter 124 which divides that output again by 12 and applies it to counter 126, a divide by five circuit. Thus, the output of counter 126 on line 128 is the pulse rate applied to counter 120 divided by a total of 3,600. In other words, the output of counter 126 appearing on line 128 is one cycle per minute, this pulse being high for approximately 12 seconds and then low for the rest of the period.

This output of the counter section is applied to the display section, specifically to element 130, a divide by 10 circuit. Initially, this element is reset by the reset command on line 132 to a "0" condition. Each time a pulse is applied to element 130 over line 128, it counts down from 0, cycling to 9, then 8, etc., until it returns to 0. An output of element 130 is applied on line 134 to element 136, also a count-down circuit that is reset to a count of 6 upon occurrence of the reset command. Accordingly, elements 136 and 130 together indicate a count of 60 which is counted down to 0, one count per minute, by the pulses applied to element 130 on line 128. Elements 130 and 136 are connected to code converter elements 140 and 142 respectively, which convert the counts of elements 130 and 136 from a binary coded decimal count to a 7-segment display code. This code is applied through resistor networks 144 and 146, respectively, to 7-segment display elements 148 and 150, respectively. These 7-segment display elements may be Texas Instruments Opto-electronics components TIL 302, element 148 displaying at least significant bit and element 150 displaying the most significant bit. These displays are the displays viewed through window 12 of the event monitor.

When the displayed count has reached "0" in both the most significant and least significant bits, the next pulse produced on line 128 will cause element 136 to signal a "borrow" condition on line 152. This signal is applied to lock counter elements 120, 122, 124 and 126 in their present condition, preventing any further pulses on line 128 and holding the system in this "0" condition. This signal also is applied to energize light 14 of the event monitor, which may be a light-emitting diode 154.

While an event monitor for a single court has been illustrated and described, it will be obvious that a multiplicity of adjacent courts all may be provided with event monitors as shown in FIG. 7. Then event monitors 170 may be located at each court, as illustrated, or in a central location such as at the pro shop 172. Additional displays 12 and light 14 may be provided at other locations, as desired, to for example signal to both the players at the court and to others at the "pro" shop over monitor 174 the period of play remaining for those on the court. Also, instead of or in addition to the light 14 the display 12 could be made to flash or blink if the court were open and available for use by players. Also, while a display has been shown on only one side of the monitor in FIGS. 1 and 2, of course another display could be provided on the opposite side to present to the players on the court the amount of time left to them as shown in FIG. 7.

Preferably the event monitor includes a system for mutilating each card placed in slot 16. This system, for example, may consist of a chopper 160 (FIG. 4) or a magnet located downstream of the photoelectric sensors 32 and actuated by the reset signal for a period of time sufficient to cut the card into small pieces or to erase the magnetic data contained in the magnetizable portion of the card.

Different cards may be provided to actuate the system if desired, one card actuating it for one period, another for a different period and also actuating other, auxiliary systems such as lights 6. To achieve this, one or more additional start command elements 96 may be provided which are connected to the count latch elements by a matrix wired for another, different binary condition, such as a binary "one." If the lights are actuated by one type of card, upon expiration of the period of play, the lights may be de-energized by the signal on line 152, for example. Rather than using different cards, different codes could be provided in different areas on one card and, by proper orientation, employed to actuate different systems or periods as desired. Also, instead of opaque areas in a transparent card, transparent areas (e.g., holes) could be provided in an opaque card.

While a photoelectric sensor system has been described, one which employs a card bearing transparent and opaque areas, of course other, different sensor systems could be used. For example, a magnetic sensor could be employed, sensors 32 then being replaced by an inductive sensor system such as one or more coils, these coils sensing a variable reluctance condition imparted to the card, for example, by a conductive foil prestamped with the pattern required to actuate the system. This foil could be laminated between two sheets of paper to conceal its pattern. For such a system it would be desirable to drive the card past the sensor at a predetermined rate, which drive could be provided by mutilating system 160, for example.

Another preferred system for monitoring game area usage is illustrated with reference to FIG. 8 and subsequent figures of the drawing. FIG. 8 illustrates a card which may be employed to actuate this system. This card, which may be of paper and typically of the weight and approximate size of a normal business card, includes indicia 210 and 211 printed along opposed, parallel edges of the card and a central stripe 212 down the center of the card, this stripe preferably being a piece of magnetic tape or other magnetizable element. Also imprinted on the card are certain information areas 213 and 214. The information conveyed by the opaque and transparent (or dark and light) areas 210 and 211 may be read by optical readers similar to those previously described. The information provided along track 212, preferably a magnetic track, may be read by a magnetic head which conveniently may incorporate a preamplifier and be designed to read magnetically recorded information at any of various speeds. An appropriate magnetic head preamplifier unit for performing these functions is made by INFOMAG of Goleta, Calif., its model No. C 0075-RG-RD-001. Viewing the card as illustrated, then, there are various distinct longitudinal information tracks, the top track (and bottom track) including pattern areas 210 and 211, the middle track being magnetic strip 212, and between these tracks a relatively clear track is provided (the sensor used to detect the presence of the card may use this latter track).

Figure 9A:
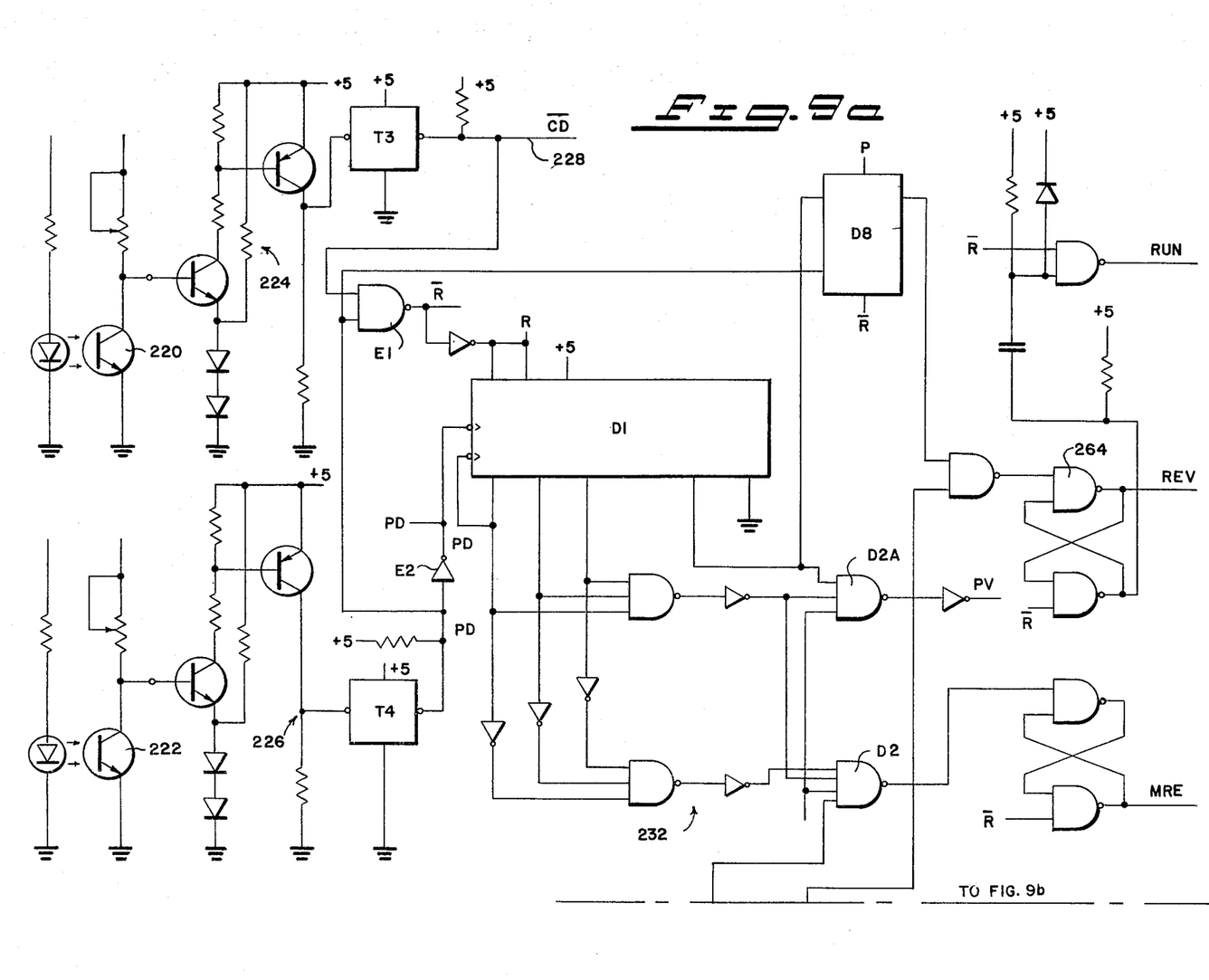
FIGS. 9A, 9B and 9C together present an electrical schematic of the logic circuit incorporated in another, preferred embodiment of the system.
Figure 9B:
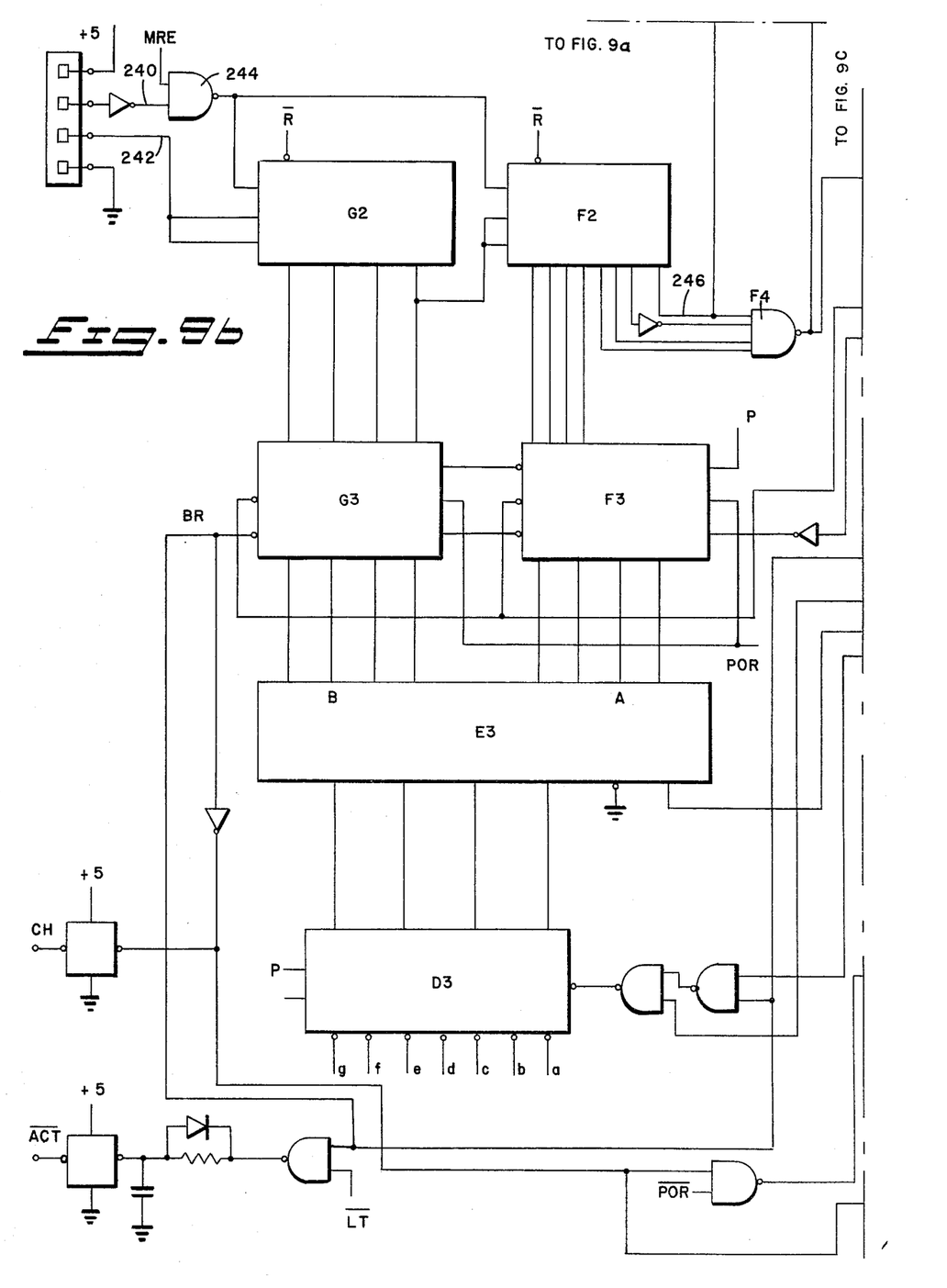
Figure 9C:
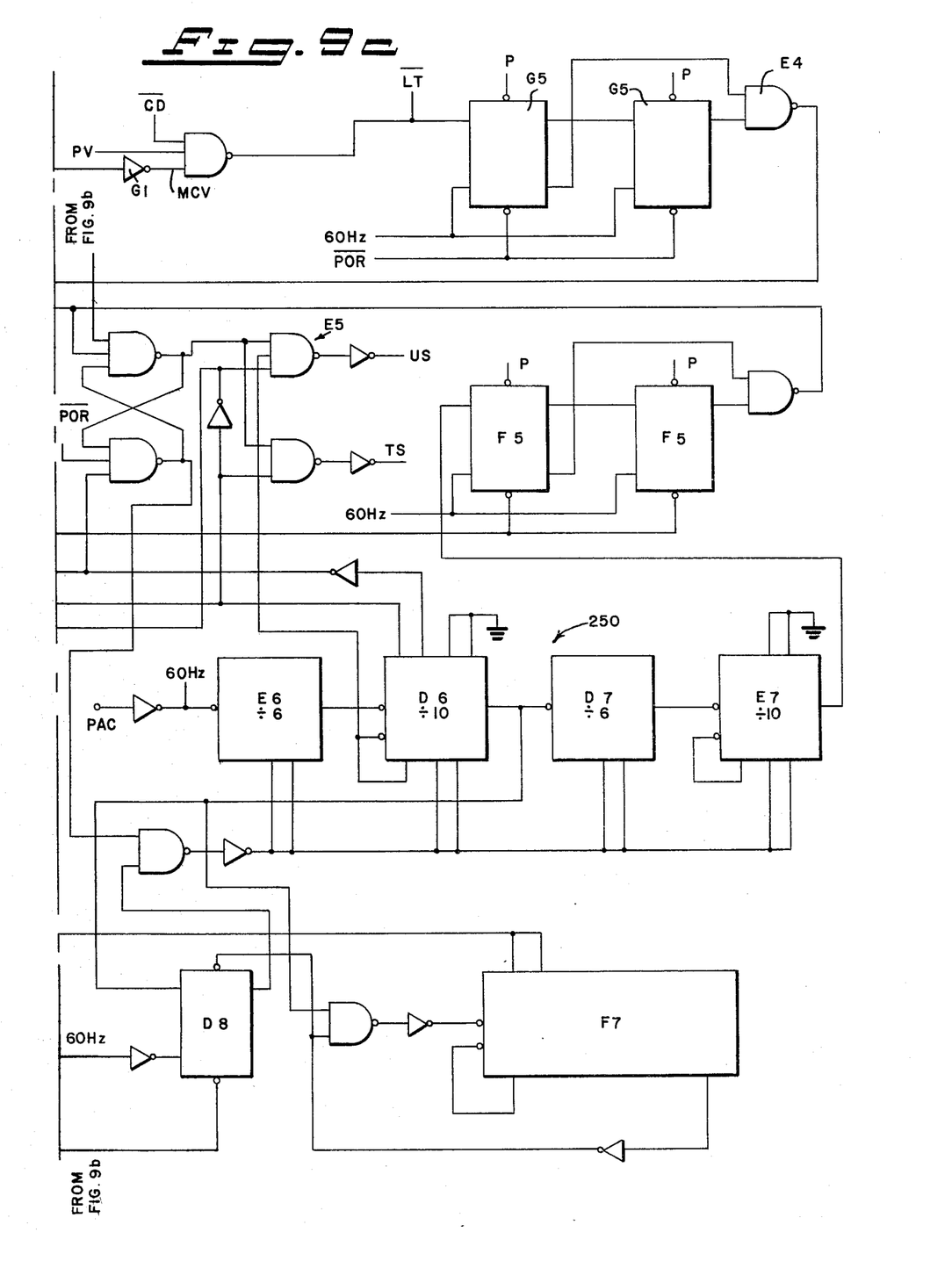

FIG. 9 illustrates a logic circuit for providing the various functions of the event monitor in response to the information conveyed by a control card such as illustrated in FIG. 8. The logic circuit includes optical readers such as described with respect to FIG. 4, an optical reader 220 being provided to examine the relatively clear track between the top and center portions of the card, however it is inserted in the reader and to produce data for the logic system, the other, optical reader 222 examining the lighter and darker areas along the outer portion of the card and producing information data in response thereto. The output of each of these readers is supplied through appropriate analog circuits 224 and 226 respectively to digital data elements T3 and T4 respectively. In response to the data sensed by reader 220, digital data element T3 produces an output $\overline{CD}$ signaling card detection or presence in the system. This signal is applied to logic element E1 and appears on conductor 228 as indicated. This conductor is electrically connected to various other conductors on the logic board as indicated by the indicia $\overline{CD}$. Similarly, the other data stream, termed pattern data, is generated by data element T4 in response to its input corresponding to the pattern of light and dark areas along along the outer longitudinal track of the card this data element producing a signal $\overline{PD}$ which is applied to element E1 and through element E2 to digital data element D1, which may be a digital element conventionally referred to as "7493A." Concidence of $\overline{PD}$ and $\overline{CD}$ causes element E1 to produce a reset output $\overline{R}$ which is applied to digital data element D1, a counter, as well as data resistors G2 and F2, causing them to be reset to zero as an initial condition.

As the optical pattern is read, D1 counts up. The digital circuitry 232 connected to the output of D1 examines the count of D1 for a binary "8" pattern and produces an output on element D2 when such a pattern exists in D1. Because of the indicia present on the card, the optical scanner will first scan pattern 211 whichever direction the card is presented to the scanner. After examining this pattern, because it consists of eight alternations of light and dark areas, D1 will present a binary "8" pattern to digital circuitry 232 causing an output to exist on element D2. Thereafter, the magnetic data on track 212 of the card will be read, then pattern 210 will be read, the circuitry requiring these particular patterns to exist in that sequence for the system to initiate a display of time on its output.

Of course, appropriate sources of power are provided for all of the circuitry of this system by one or more conventional power supplies and, in a conventional fashion, upon actuation of the system a digital signal is generated, power on reset (POR) as well as $\overline{POR}$, and applied to reset selected digital systems to a desired state. Also, upon being energized a motor circuit is conditioned to be actuated upon presentation of a card to the system, this circuit causing the card to be pulled into the system and driven past the various sensor elements.

As the card is read by the system, preferably by being driven past the optical and magnetic reading heads by a motor, the magnetic head reads the information recorded on magnetic strip 212 producing an output through its preamplifier that results in clock pulses on line 240 and data pulses on line 242. Both of these pulse streams are applied to element 244 together with a magnetic read enable signal (MRE) derived from the circuit which verified the optical data.

The clock pulses, and the absence of R, cause digital element G2, which may be a "74164" element, to be loaded with the data appearing on line 242. Simultaneously another digital data element F2 is also loaded with data, this data being the data appearing on the last element of G2. Element F2 also may be a digital element conventionally referred to as 74164. Preferably the magnetic data track 212 on the data card is first loaded with a series of "zeroes." Thus, as the card is being examined elements G2 and F2 will first be cleared of any extraneous or random information that they may include to contain a sequence of zeroes. The data magnetically recorded on track 212 in any convenient, conventional fashion may consist of a series of 16 or more digital indicia the first of which will always be a digital 1 to signal the start of the data. For example, this data stream may be divided into a first series of four indicia that are employed to verify the following magnetic data, then two series of four indicia each to convey a binary representation of time information, then a final series of four digital indicia to convey other control information such as a signal to actuate a court lighting system or other auxiliary equipment. This data series is loaded into elements G2 and F2 as a valid card is being read since it causes an output to exist on element D2 and signal MRE therefore to be present.

When the initial digital "1" in the magnetically recorded data has been fully loaded through elements G2 and F2 and exists at the last output of element F2, it is conducted by line 246 and applied to element D causing its output to terminate the MRE. As a result, no further clock pulses will be applied to element G2 through element 244. Thus, in this fashion the magnetic data on track 212 of the card is loaded into, and held in, registers G2 and F2.

Element F4 examines the state of the last four digital sections of register F2. If the appropriate indicia verifying the subsequent magnetic data exists there, element F4 will produce a magnetic card verified signal (MCV) which in turn is applied to element G1. As the card proceeds through the reader, optical pattern 210 next will be scanned. This pattern causes register D1 to be loaded with an additional 7 counts, which state is detected by element D2A and a pattern verified signal (PV) to be produced in turn by element E2A. This signal also is applied to digital element G4 together with the $\overline{CD}$ signal, the concurrence of these signals causing this data element to produce a load timer signal (LT).

This output is applied through digital data elements G5 and E4 to the load inputs of digital data elements G3 and F3 connected respectively to G2 and F2. This causes elements G3 and F3 to load into their memory the signals appearing at the last four data elements of G2 and the first four elements of F2. Thus, the time indicated by this data stream is captured by data elements G3 and F3, but only after the optical card and pattern data had been examined to verify the correctness of the card and the first four elements of the digital data stream also had been examined to verify the magnetic data on the card. Elements G3 and F3 may be digital devices conventionally identified as "74192."

Digital data elements G3 and F3 are wired to be counted down in response to a digital circuit 250 shown in the lower right portion of the logic diagram. This circuit consists of digital data elements E6, D6, D7 and E7, elements E6 and D7 preferably being digital devices 7492A and elements D6 and E7 preferably being digital devices 7490A. To device E6 is applied a 60 Hz line signal, the time or clock signal of the system, which in E6 is divided by 6, in D6 divided by 10, in D7 divided by 6, and in E7 divided by 10. Thus, D6 produces an output signal at the rate of 1 pulse per second and E7 produces an output signal at the rate of 1 pulse per minute. The output of E7 is applied to a digital circuit consisting of elements F5, together with the 60 Hz clock signal, the output of this circuit being a pulse that is applied to F3 causing it to decrement at the rate of 1 unit per minute.

The display employed in the event monitor of this system may consist of two seven segment numerals, a tens numeral and a units numeral. Two such numeral sets may be provided, one on one face of the event monitor, the other on the opposite face of the event monitor to permit both those using the court and those external to the court to see the period of court usage remaining. The digital data recorded in elements G3 and F3 is in binary coded decimal form. This must be translated to a form appropriate for such 7-segment displays. To do this, digital data element D3, which may be a device commonly referred to as 7447A, is connected to element E3 which may be a 7415 element. The units output of F3 for convenience is termed portion A in E3, the tens output of G3 being termed portion B in E3. Portions A and B are periodically switched to the output of E3 and applied to digital data element D3 connected thereto. This switching is done under control of an output from element D6 as indicated. Element D3 translates the binary coded decimal information provided by element E3 into an output appropriate to actuate a 7-segment display to visually present the numeral designated by that binary coded decimal information. For convenience, the various outputs of element D3 have been labeled a through g inclusive. They are employed to actuate the display driver illustrated in FIG. 10. Though an electromechanical display of the 7-segment variety is used here, various other types of numeric display not necessarily limited to seven segments may be employed, such as "nixie" tube decimal display.

Figure 10:
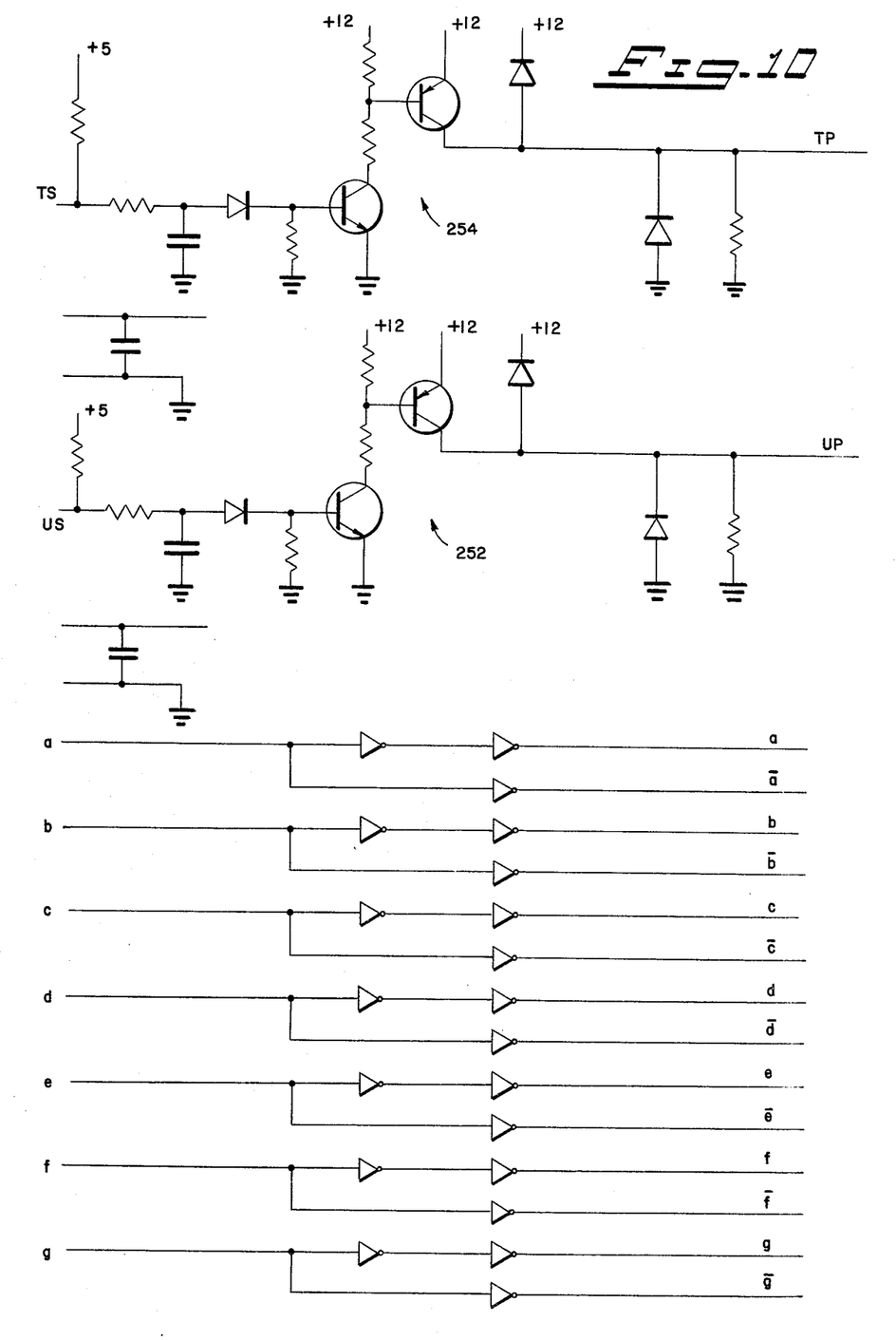
FIG. 10, including a–g, is an electrical schematic of the display driver associated with the circuitry shown in FIG. 9.
Figure 11:
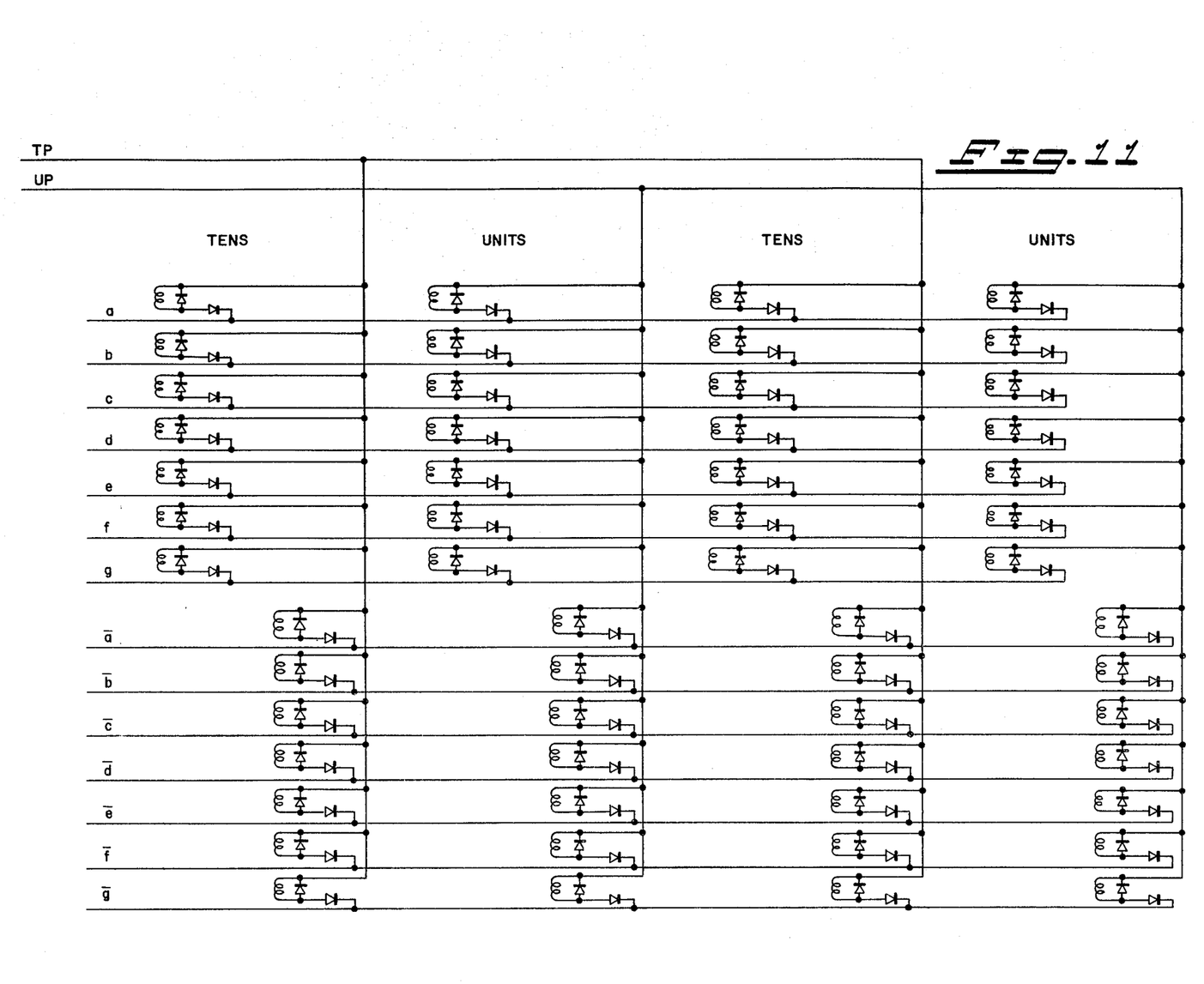
FIG. 11 is an electrical schematic of the time display circuitry incorporated in the system of FIG. 9.

The display driver shown in FIG. 10 includes, in addition to the logic circuit actuated by signals a through g inclusive, "units" and "tens" actuation circuitry. This actuation circuitry is triggered by strobe pulses provided by a digital data element circuit E5 shown above the clock circuit in the logic diagram and actuated by an output of D6, among other outputs. This circuit produces units strobe pulses (US) and tens strobe pulses (TS) which signals are in turn applied to circuits 252 and 254 in FIG. 10, respectively. The logic circuitry connected to lines a through g of D3 translates the signals appearing thereon into a series of signals a, $\overline{a}$, b, $\overline{b}$, . . . g, $\overline{g}$. These signals, and the tens pulse (TP) and units pulse (UP) signals produced by circuits 252 and 254 of FIG. 10 are in turn applied to the circuitry shown in FIG. 11, this circuitry being the connections to the seven segments of the tens and units numerals on the front and rear portion of the event monitor. Thus, the logic circuit in conjunction with the display driver circuit and the display first verifies the actuating card, then reads the time information magnetically recorded thereon and employs that information to actuate and control a visual display of the period of play remaining on the court. This period is decremented by the logic circuitry in response to the output of E7 until finally no time is left. At that instant, the borrow output of the tens logic device G3 produces a signal, BR, which is applied to actuate various signaling devices such as a chime designated by output CH. Other elements, such as court lighting, also may be controlled by this logic circuitry, the BR output being employed to generate a signal terminating actuation of such auxiliary systems, this signal being $\overline{ACT}$. Further, if desired, the time display may be made to flash repeatedly a number of times at the conclusion of the allotted period. This is controlled by the logic circuitry illustrated in the lower right portion of the logic diagram, this circuitry including logic elements F7 and D8, output BR being employed to actuate both of these elements. Should a remote display of the period of play remaining for the area being covered by the event monitor be desired, it may be provided and driven in a fashion identical to the manner in which the front and rear displays are actuated as shown in FIG. 11.

By inclusion of the third, selectively variable magnitude data strip it is possible to employ a standard actuation card for all event monitors, wherever their location, yet to limit the use of such cards to only certain of such event monitors, or only during certain periods, or otherwise to limit and control usage of the system. For example, if such event monitors are installed in two adjacent cities, cards intended for use in the court system of one city would not and should not be used in the court system of the other city. Thus, different magnetic verification codes would be employed for each city. However, if a card for one city were attempted to be used in an event monitor at another city, it is desirable not to mutilate or otherwise destroy the usefulness of that card, but rather to return it to the user. For that reason, the logic circuitry incorporates the logic system indicated in the upper right hand portion and generally designated as circuit 260. As part of that circuitry, digital data element D8 generates an output in response to the optical data, this output occurring after the magnetic data should have been read. It is applied to logic element 262 together with the output of F4. If no output by F4 has occurred at this time, digital element 263 is actuated to cause the motor driving the card past the read heads to be reversed thereby ejecting the card. However, if the optical information on the card was not correct, this would not occur, permitting the card to continue its advance into the system and causing the card to be mutilated. In other words, only optically valid but magnetically invalid cards would be ejected.

While preferred embodiments of the event monitor and data card have been described, and a specific circuitry has been disclosed, it will be apparent to those skilled in this art that other constructions may be employed, and other, equivalent circuits may be used. Accordingly, the scope of the invention should not be limited by the preferred embodiments but rather is defined by the following claims.

We claim:

1. A reusable, programmable card for use in actuating a control system having means for reading multiple tracks of data along the card, the card including:
   a first data track having data readable in a first manner and providing, when read by the control system, a first data input for the control system; and
   a second data track having data readable in a second manner substantially different than said first manner and providing, when read by the control system, a second data input for the control system, at least one of the data tracks being reprogrammable without substantial alteration of the visual appearance of the card, the second data track being parallel to the first data track and oriented on the card such that the data on the card can be read in at least two different orientations of the card and used to actuate the control system when read in either orientation.

2. A card as set forth in claim 1 in which at least one of the data tracks is provided along a first edge of the card and along a second, opposed edge of the card such that the card can be rotated 180 degrees and the data on the card still be read by the control system.

3. A card as set forth in claim 2 in which the data on at least one of said data tracks is in the form of optically distinguishable areas incorporated on the card.

4. A card as set forth in claim 1 in which the card includes a third data track, the third data track providing, when read by the control system, a third data input for the control system, the third data track also being oriented on the card such that the data on the card can be read by the control system in at least two different orientations of the card and used to actuate the control system when read in either orientation.

5. A card as set forth in claim 4 in which the three data tracks are substantially parallel.

6. A card as set forth in claim 5 in which one of the data tracks is oriented generally along the longitudinal center of the card, the data thereon being sequentially recorded in an ascending then descending data sequence generally about the center of the card to provide an initially ascending data sequence in either direction the data is read along the longitudinal track.

7. A card as set forth in claim 6 in which the data on at least one of the tracks is in the form of optically lighter and darker areas imprinted on the card, the card including a magnetizable portion, another of the data tracks being magnetically recorded on the magnetizable portion.

8. A card as set forth in claim 4 in which the card includes a magnetizable portion constituting at least one of said data tracks.

9. A card as set forth in claim 4 in which the card includes a series of optically distinguishable areas incorporated on the card, these areas constituting at least one of said tracks.

10. A card as set forth in claim 2 in which the card includes a magnetizable portion constituting at least of one said data tracks, said magnetizable portion being selectively alterable permitting data to be erased, changed or supplemented.

* * * * *